(12) United States Patent
Callanan et al.

(10) Patent No.: US 8,296,367 B2
(45) Date of Patent: Oct. 23, 2012

(54) SYNCHRONIZING SHARED FILES DURING COMMUNICATION SESSIONS

(75) Inventors: Sean Callanan, Dublin (IE); Ruthie D. Lyle, Durham, NC (US); Patrick J. O'Sullivan, Dublin (IE); Fred Raguillat, Dublin (IE); Carol S. Zimmet, Boxborough, MA (US)

(73) Assignee: International Business Machines Corporation, Armonk, NY (US)

( * ) Notice: Subject to any disclaimer, the term of this patent is extended or adjusted under 35 U.S.C. 154(b) by 247 days.

(21) Appl. No.: 12/643,642

(22) Filed: Dec. 21, 2009

(65) Prior Publication Data

US 2011/0153746 A1    Jun. 23, 2011

(51) Int. Cl.
*G06F 15/16* (2006.01)
*G06F 7/00* (2006.01)
*G06F 17/00* (2006.01)

(52) U.S. Cl. .................. 709/205; 707/617; 707/783

(58) Field of Classification Search .......... 709/201–207, 709/217–219, 246, 248; 707/609–704
See application file for complete search history.

(56) References Cited

U.S. PATENT DOCUMENTS

| 2005/0234943 | A1* | 10/2005 | Clarke .......................... 707/100 |
| 2006/0235851 | A1* | 10/2006 | Akachi .............................. 707/9 |
| 2007/0079249 | A1* | 4/2007 | Pall et al. ....................... 715/758 |
| 2008/0082609 | A1 | 4/2008 | O'Sullivan et al. |
| 2008/0104173 | A1 | 5/2008 | Wilcox et al. |
| 2008/0189623 | A1 | 8/2008 | Patil |
| 2009/0275403 | A1* | 11/2009 | Proctor ........................... 463/29 |

OTHER PUBLICATIONS

Kim, A. "Apple to Allow Background Tasks on IPhone?" Feb. 3, 2009, WWW.MACRUMORS.COM/2009/02/03/APPLE-TO-ALLOW-BACKGROUND-TASKS-ON-IPHONE/, pp. 1-3.
Williams, H. "Apple's IPhone SDK Prohibits Real Mobile Innovation," Mar. 13, 2008, HTTP://WHYDOESEVERYTHINGSUCK.COM/2008/03/APPLES-IPHONE-SDK-PROHIBITS-REAL-MOBILE.HTML.

* cited by examiner

*Primary Examiner* — Shirley Zhang
(74) *Attorney, Agent, or Firm* — Law Office of Jim Boice

(57) ABSTRACT

A computer-implemented method, system and computer program product for synchronizing copies of a shared file used by different communication session participants is presented. A shared file that is used by a first communication session participant and a second communication session participant is identified. The first and second communication participants each use a separate copy of the shared file. In response to detecting a communication session between the first and second communication session participants, the separate copies of the shared file are automatically synchronized.

9 Claims, 3 Drawing Sheets

SYNCHRONIZING SHARED FILES DURING COMMUNICATION SESSIONS

BACKGROUND

The present disclosure relates to the field of computers, and specifically to the use of computers during communication sessions. Still more particularly, the present disclosure relates to synchronizing shared files during communication sessions.

BRIEF SUMMARY

A computer-implemented method, system and computer program product for synchronizing copies of a shared file used by different communication session participants is presented. A shared file that is used by a first communication session participant and a second communication session participant is identified. The first and second communication participants each use a separate copy of the shared file. In response to detecting a communication session between the first and second communication session participants, the separate copies of the shared file are automatically synchronized.

DETAILED DESCRIPTION

As will be appreciated by one skilled in the art, the present disclosure may be embodied as a system, method or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Figure 1:
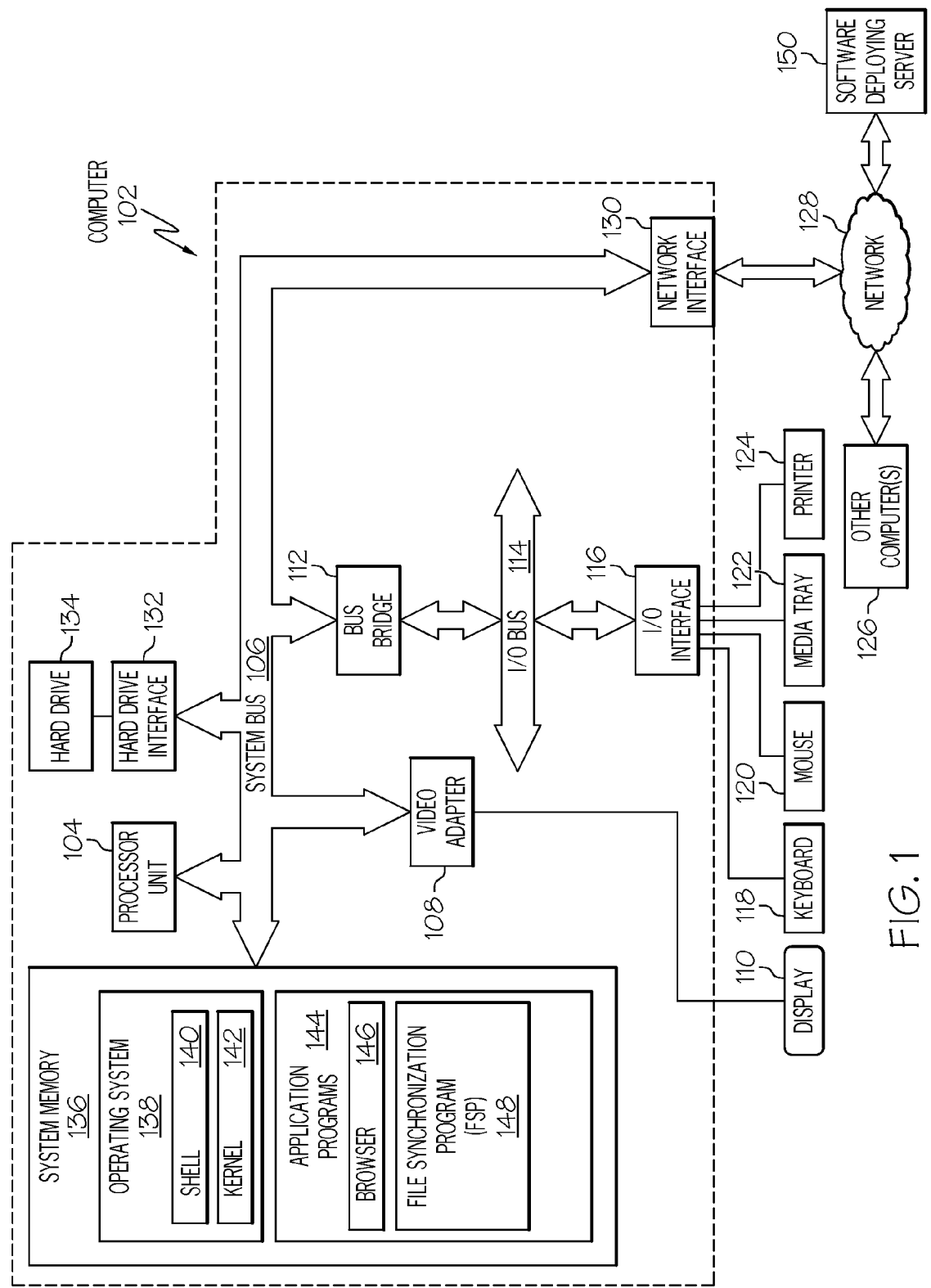
FIG. 1 depicts an exemplary computer that may be used in implementing the present disclosure.

With reference now to the figures, and in particular to FIG. 1, there is depicted a block diagram of an exemplary computer 102, which may be utilized by the present disclosure. Note that some or all of the exemplary architecture, including both depicted hardware and software, shown for and within computer 102 may be utilized by other computer(s) 126 and/or a software deploying server 150.

Computer 102 includes a processor unit 104 that is coupled to a system bus 106. Processor unit 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multimedia interfaces, etc.), and a printer 124. While the format of the ports connected to I/O interface 116 may be any known to those skilled in the art of computer architecture, in a preferred embodiment some or all of these ports are universal serial bus (USB) ports.

As depicted, computer 102 is able to communicate with a software deploying server 150, and other computer(s) 126 via network 128 using a network interface 130. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In a preferred embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present disclosure will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other described computer systems.

Application programs 144 in computer 102's system memory (as well as software deploying server 150's system memory) also include a file synchronization program (FSP) 148. FSP 148 includes code for implementing some or all of the processes described below, including those described in FIGS. 2-3.

In one embodiment, computer 102 is able to download FSP 148 from software deploying server 150, including in an on-demand basis, such that the code from FSP 148 is not downloaded until runtime or otherwise immediately needed by computer 102. Note further that, in one embodiment of the present disclosure, software deploying server 150 performs all of the functions associated with the present disclosure (including execution of FSP 148), thus freeing computer 102 from having to use its own internal computing resources to execute FSP 148.

The hardware elements depicted in computer 102 are not intended to be exhaustive, but rather are representative to highlight essential components required by the present disclosure. For instance, computer 102 may include alternate memory storage devices such as magnetic cassettes, digital versatile disks (DVDs), Bernoulli cartridges, and the like. These and other variations are intended to be within the spirit and scope of the present disclosure.

Figure 2:
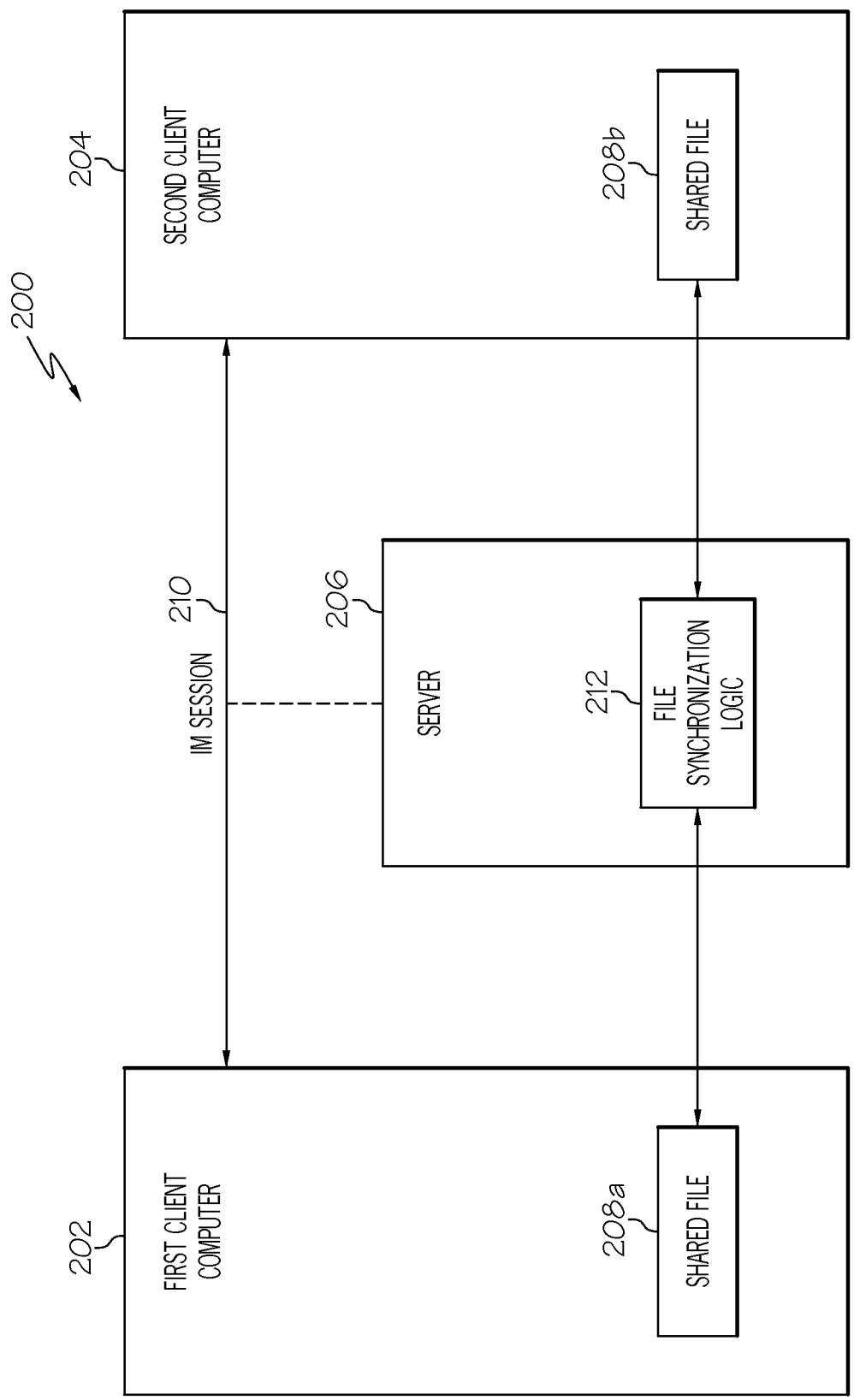
FIG. 2 illustrates an exemplary network in which the present disclosure can be implemented.

With reference now to FIG. 2, an exemplary network 200, in which the present disclosure may be implemented, is presented. Network 200 comprises a first client computer 202 and a second client computer 204, which may be some of the other computer(s) 126 depicted in FIG. 1. Coupled between the first and second client computers 202/204 is a server 206 (which may be the computer 102 shown in FIG. 1). Each of the client computers 202/204 has a copy of a shared file 208a-b. Alternatively, the separate copies 208a-b, or a single copy (not shown), may be stored in a third computer (e.g., server 206).

When server 206 detects a communication session, such as an instant messaging (IM) session 210, being conducted between a first communication session participant (e.g., a user of first client computer 202) and a second communication session participant (e.g., a user of second client computer 204), file synchronization logic 212 (which may be part of FSP 148 described above) automatically synchronizes the shared files 208a-b, such that they each contain the same (updated) data. Note that the communication session may be a real-time communication session (e.g., an IM session, a web conference, etc.), or it may be an asynchronous communication session (e.g., an e-mail session). Furthermore, the communication session may be among a group of participants, including members of a group conference phone call, a group multi-media conference, a group web conference, etc.

In one embodiment, server 206 identifies which files (e.g., 208a-b) are shared by two communication session participants, detects the communication session between those communication session participants, and automatically synchronizes the shared files 208a-b. In another embodiment, some or all of these activities are performed by one or both of the client computers 202/204, or by another computer (not depicted).

Figure 3:
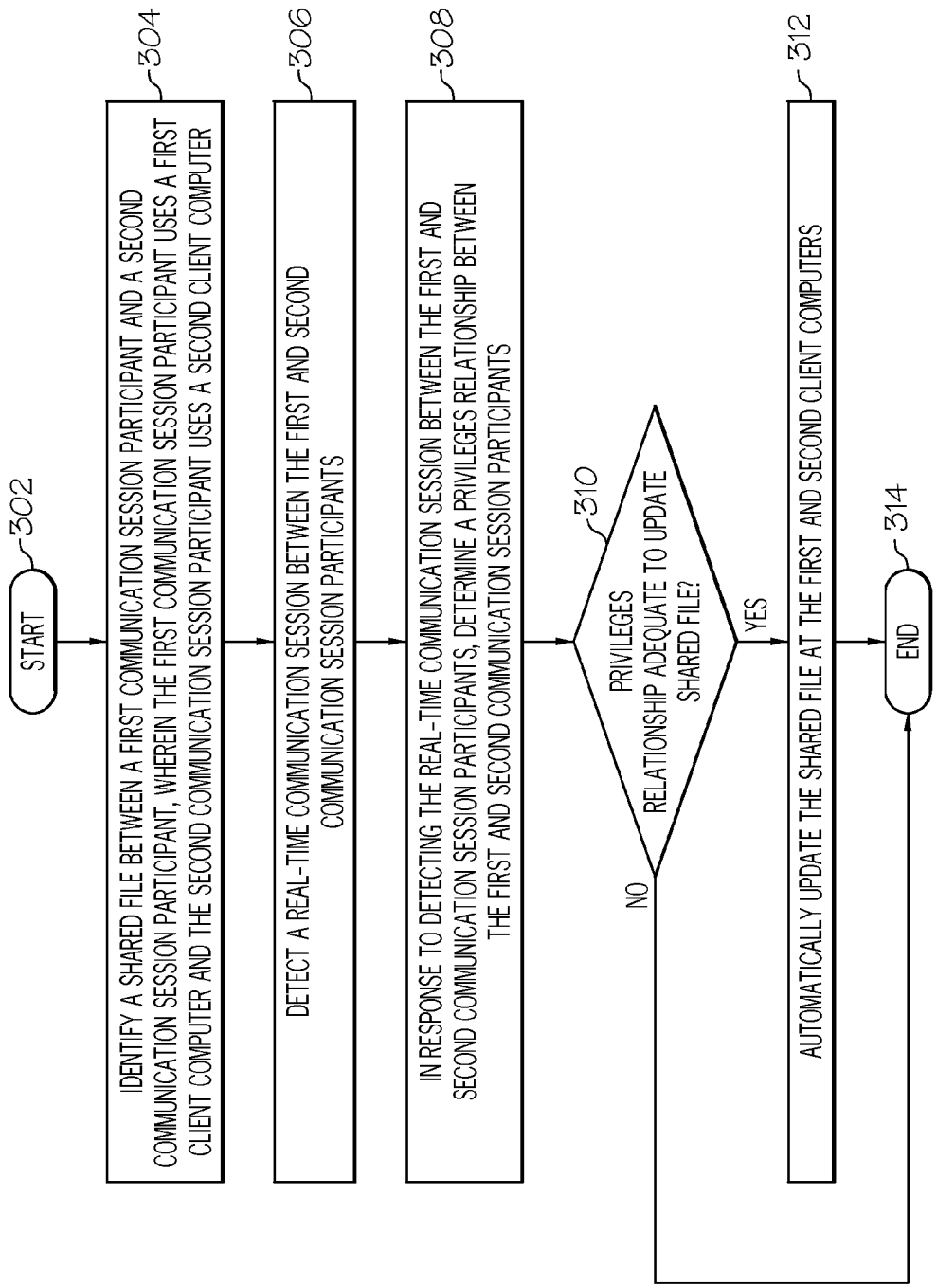
FIG. 3 is a high level flow chart of one or more exemplary steps performed by hardware logic to synchronize shared files between communication session participants.

Referring now to FIG. 3, a high level flow chart of one or more exemplary steps performed by hardware logic to synchronize files between communication session participants is presented. After initiator block 302, a shared file that is used by a first communication session participant and a second communication session participant is identified (block 304). As described above, the first and second communication participants each use a separate copy of the shared file, which may be stored locally or remotely. As described in block 306, a processor (e.g., part of server 206 shown in FIG. 2) detects a communication session between the first and second communication session participants. As described in block 308, a privileges relationship between the first and second communication session participants is determined. This privileges relationship may be used to control the synchronization of a shared file only if the privileges relationship is deemed adequate to authorize the shared file to be updated. That is, assume that the two communication session participants have a level of trust that leads to a privileges relationship of 5 on a scale of 1-5. This will allow them to share updates on any shared file. However, if the level of trust (and thus privileges relationship) is less than 5, then the users will be permitted to update/synchronize only non-sensitive files, if any, from their shared files. Determining this level of trust, and thus privileges relationship, can be based on several factors, including but not limited to: the first and second communication session participants being on a same instant messaging trusted communication session participants list; the first and second communication session participants being in a same work group; the first and second communication session participants having a history of frequent (e.g., daily) communication session; the first and second communication session participants being assigned a trust level (between 1 and 5) by a manager or other third party; the tone and content of messages between the first and second communication session participants; etc.

As depicted in block 310, if the trust level is not high enough ("No"), then the synchronization of data in the shared file between the first and second copies can be so limited that no synchronization/updating is permitted. Otherwise, ("Yes"), the separate copies of the shared files are automatically synchronized, either in full (trust rating 5) or partially (trust rating below 5) (block 312). The process ends at terminator block 314.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described embodiments of the disclosure of the present application in detail and by reference to illustrative embodiments thereof, it will be apparent that modifications and variations are possible without departing from the scope of the disclosure defined in the appended claims.

What is claimed is:

1. A computer-implemented method of synchronizing copies of a shared file used by different communication session participants, the computer-implemented method comprising:
   identifying a shared file that is used by a first communication session participant and a second communication session participant, wherein the first and second communication participants each use a separate copy of the shared file, wherein non-synchronized versions of the shared file are initially stored in a first client computer that is used by the first communication session participant and in a second client computer that is used by the second communication session participant, wherein a first non-synchronized version of the shared file is an updated copy of the shared file that contains updated data, and wherein a second non-synchronized version of the shared file is a non-updated copy of the shared file that does not contain updated data;
   a processor detecting a communication session between the first and second communication session participants, wherein the communication session is a real-time communication session from a group consisting of an instant messaging session, a web conference, and an asynchronous e-mail session;
   determining a privileges relationship between the first and second communication session participants;
   synchronizing the separate copies of the shared file only if the privileges relationship is deemed adequate to authorize the shared file to be updated;
   limiting what data in the shared file can be synchronized between the separate copies of the shared file based on the privileges relationship between the first and second communication session participants, wherein the privileges relationship is based on an historical frequency of communication sessions between the first and second communication session participants exceeding a predetermined frequency; and
   automatically synchronizing the separate copies of the shared file in response to detecting the communication session between the first and second communication session participants, wherein the separate copies of the shared file are synchronized by automatically updating data in the non-updated copy of the shared file for storage in the second client computer.

2. The computer-implemented method of claim 1, wherein copies of the separate copies of the shared file are stored in a third computer.

3. The computer-implemented method of claim 2, wherein the third computer is a server that performs the identifying, detecting, and automatic synchronizing operations.

4. The computer-implemented method of claim 1, wherein the privileges relationship is based on the first and second communication session participants being on a same instant messaging trusted communication session participants list.

5. The computer-implemented method of claim 1, further comprising:
   limiting what data in the shared file can be synchronized between the separate copies of the shared file based on the privileges relationship between the first and second communication session participants, wherein the privileges relationship is based on a first trust level value set for the first communication session participant and a second trust level value set for the second communication session participant, and wherein the first and second trust level values are set by a third party that is not one of the first and second communication session participants.

6. A computer program product comprising a computer readable storage device embodied therewith, the computer readable storage device comprising:
   computer readable program code configured to identify a shared file that is used by a first communication session participant and a second communication session participant, wherein the first and second communication participants each use a separate copy of the shared file, wherein non-synchronized versions of the shared file are initially stored in a first client computer that is used by the first communication session participant and in a second client computer that is used by the second communication session participant, wherein a first non-synchronized version of the shared file is an updated copy of the shared file that contains updated data, and wherein a second non-synchronized version of the shared file is a non-updated copy of the shared file that does not contain updated data;
   computer readable program code configured to detect a communication session between the first and second communication session participants, wherein the communication session is a real-time communication session from a group consisting of an instant messaging session, a web conference, and an asynchronous e-mail session;
   computer readable program code configured to determine a privileges relationship between the first and second communication session participants;
   computer readable program code configured to synchronize the separate copies of the shared file only if the privileges relationship is deemed adequate to authorize the shared file to be updated;
   computer readable program code configured to limit what data in the shared file can be synchronized between the separate copies of the shared file based on the privileges relationship between the first and second communication session participants, wherein the privileges relationship is based on an historical frequency of communication sessions between the first and second communication session participants exceeding a predetermined frequency; and
   computer readable program code configured to automatically synchronize the separate copies of the shared file in response to detecting the communication session between the first and second communication session participants, wherein the separate copies of the shared file are both automatically synchronized by automatically updating data in both separate copies of the shared file.

7. The computer program product of claim 6, wherein the first communication session participant uses a first client computer and the second communication session participant uses a second client computer, and wherein the first and second client computers each locally store a copy of the shared file.

8. A computer system comprising:
a central processing unit; and
a computer readable memory coupled to the central processing unit, wherein the computer readable memory comprises software which, when executed, causes the central processing unit to implement:
identifying a shared file that is used by a first communication session participant and a second communication session participant, wherein the first and second communication participants each use a separate copy of the shared file, wherein non-synchronized versions of the shared file are initially stored in a first client computer that is used by the first communication session participant and in a second client computer that is used by the second communication session participant, wherein a first non-synchronized version of the shared file is an updated copy of the shared file that contains updated data, and wherein a second non-synchronized version of the shared file is a non-updated copy of the shared file that does not contain updated data;
detecting a communication session between the first and second communication session participants, wherein the communication session is a real-time communication session from a group consisting of an instant messaging session, a web conference, and an asynchronous e-mail session;
determining a privileges relationship between the first and second communication session participants;
synchronizing the separate copies of the shared file only if the privileges relationship is deemed adequate to authorize the shared file to be updated;
limiting what data in the shared file can be synchronized between the separate copies of the shared file based on the privileges relationship between the first and second communication session participants, wherein the privileges relationship is based on an historical frequency of communication sessions between the first and second communication session participants exceeding a predetermined frequency; and
automatically synchronizing the separate copies of the shared file in response to detecting the communication session between the first and second communication session participants, wherein the separate copies of the shared file are both automatically synchronized by automatically updating data in both separate copies of the shared file.

9. The computer system of claim 8, wherein the first communication session participant uses a first client computer and the second communication session participant uses a second client computer, and wherein the first and second client computers each locally store a copy of the shared file.

* * * * *